(12) United States Patent
Oh

(10) Patent No.: US 7,854,841 B2
(45) Date of Patent: Dec. 21, 2010

(54) COMBINED ANAEROBIC PROCESS APPARATUS FOR TREATING ORGANIC WASTES

(75) Inventor: Sae Eun Oh, Daejeon (KR)

(73) Assignee: Hanbat National University Industry-Academic Cooperation Foundation, Daejeon (KR)

(*) Notice: Subject to any disclaimer, the term of this patent is extended or adjusted under 35 U.S.C. 154(b) by 81 days.

(21) Appl. No.: 12/409,033

(22) Filed: Mar. 23, 2009

(65) Prior Publication Data

US 2009/0255869 A1 Oct. 15, 2009

(51) Int. Cl.
*C02F 3/28* (2006.01)
*C02F 11/04* (2006.01)

(52) U.S. Cl. .................. 210/603; 210/609; 210/615; 210/617; 210/173

(58) Field of Classification Search .......... 210/603, 210/609, 615, 616, 617, 173, 252, 259
See application file for complete search history.

(56) References Cited

U.S. PATENT DOCUMENTS

| | | | | |
|---|---|---|---|---|
| 4,067,801 A | * | 1/1978 | Ishida et al. | 210/603 |
| 4,119,495 A | * | 10/1978 | Belyaev et al. | 435/243 |
| 6,558,550 B1 | * | 5/2003 | Kelly | 210/609 |
| 6,905,600 B2 | | 6/2005 | Lee, Jr. | |
| 2007/0095734 A1 | * | 5/2007 | Lee | 210/180 |

FOREIGN PATENT DOCUMENTS

| | | | |
|---|---|---|---|
| DE | 4030668 A1 | * | 4/1992 |
| JP | 62-279899 A | * | 12/1987 |
| JP | 2001-205300 A | * | 7/2001 |
| JP | 2003-103292 A | * | 4/2003 |
| JP | 2007175582 A | | 7/2007 |
| KR | 1020040028698 A | | 4/2004 |
| KR | 1020040100134 A | | 12/2004 |
| KR | 100787074 B1 | | 12/2007 |

* cited by examiner

*Primary Examiner*—Fred Prince
(74) *Attorney, Agent, or Firm*—Fredrikson & Byron, PA

(57) ABSTRACT

The present invention relates to a combined anaerobic process apparatus for treating organic wastes, comprising: a first solid-liquid separator to separate organic wastes into liquid wastes and solid wastes; an acid-forming tank to decompose the liquid wastes separated through the first solid-liquid separator using acid-forming microorganisms; a USAB reactor to decompose the liquid wastes discharged from the acid-forming tank using anaerobic microorganisms; a crushing tank to crush the solid wastes separated through the first solid-liquid separator finely; a mixing tank to mix solid wastes crushed through the crushing tank with microorganisms; and a dry-anaerobic tank to dry solid wastes mixed with microorganisms through the mixing tank, in an anaerobic manner.

13 Claims, 3 Drawing Sheets

COMBINED ANAEROBIC PROCESS APPARATUS FOR TREATING ORGANIC WASTES

CROSS-REFERENCE TO RELATED APPLICATION

This application claims the benefit of Korea Application No. 10-2008-0033949 filed on Apr. 11, 2008, the contents of which are hereby incorporated by reference in their entirety.

BACKGROUND OF THE INVENTION

Field of the Invention

The present invention relates to a combined anaerobic process apparatus for treating organic wastes. More particularly, the present invention relates to the combined anaerobic process apparatus which separates organic wastes having a lot of moisture into liquid wastes and solid wastes, and treats each waste in anaerobic condition simultaneously as well as provides and returns anaerobic microorganisms cultured through the treatment process to an each reactor with high efficiency. Moreover, the combined anaerobic process apparatus enables non-discharging treatment by collecting bio-gas generated from the treatment process and circulating waste liquor.

Recently, there has increasing the necessity for the suitable management of organic wastes due to the increase of food wastes and sewage sludge etc. Especially, in order to settle down the restriction policy regarding direct landfill of sewage sludge, food wastes, livestock excretions and organic Municipal Solid Waste (MSW), and to cope with the restriction program for controlling discharge of these wastes into a sea in the future, it is necessary to establish a multilateral treatment system for treating and recycling wastes.

Accordingly, the treatment methods of anaerobic digestion, which can decrease down the amount of sludge generated from treatment of the organic wastes and produce bio-gas such as methane and carbon dioxide as a by-product, have been attracting attentions. The treatment methods of anaerobic digestion are to treat organic wastes under the anaerobic conditions.

There are two advantages in the treatment methods; one is an excellence in the digestion efficiency of organic wastes, the other is possibility to collect bio-gas generated in the process of treating organic wastes.

A research on high rate bio-gas producing treatment system using organic waste has been started in 1990 with development of renewable energy in Korea. After then, upflow anaerobic treatment process (UASB) has been developed in order to convert food industrial wastewaters to energy, and up to now it is being used in industries.

However, the UASB process has limited to apply wastewater with low solid content less than 300-500 mgSS/L.

As a result, development on a modern and high-efficient anaerobic treatment process, which can treat wastes with high solid content such as sewage sludge, livestock excretions, and food wastes has been accelerated. Further, full scale UASB processes has been successfully applied and operated in treating some organic wastes like animal wastes.

However, animal manure, sewage sludge, food wastes etc. are fundamentally organic wastes containing high solid content. Thus, in order to apply these wastes to the UASB process, pre-treatment systems such as an introduction of separator for solid-liquid separation, and hydrolysis tank (or acid-forming tank) for dissolving the separated liquid is needed.

As stated above, the anaerobic digestion treatment process is a proper technology to collect energy from organic wastewaters and wastes.

In addition, treatment rate of organics has been increasing up slowly according to the development of technology of digestion treatment and introduction of the pre-treatment system and collection rate has been increased, but it take shortage to meet person's expectation.

In order to solve the problems above, the Korean patent no. 10-0199315 took notice the merging system for treating food waste and sewage sludge (See FIG. 1).

However, the merging treatment system, which digest food wastes and sewage sludge anaerobically, has following disadvantages: the first problem lies in a difficulty of solid-liquid separation of mixed culture including acid-forming bacteria and volatile fatty acids (VFAs), the second problem lies in a difficulty of treating wastes with high solid content.

Additionally, there is another problem that treatment of organics need long time more than 10 days to convert high solid organics into easily dissolved VFAs.

To overcome the problems stated, the Korean patent no. 10-0521866 (Method and apparatus for the treatment of particulate biodegradable organic wastes) took notices the apparatus to collect bio-gas through treating fine particles organic wastes (See FIG. 2).

The apparatus is to treat anaerobically it after solubilizing particulate organics under the high temperature and high pressure. However, the method takes a lot of energy during the pre-treatment.

SUMMARY OF THE INVENTION

For solving the problems stated above, the object of this invention is to provide a combined anaerobic process apparatus for treating organic wastes with short treating time and enhanced efficiency, which separates organic wastes into liquid wastes and solid wastes and treat each waste by wet treatment system and dry treatment system according to characteristic of each waste.

The another object of the present invention is to provide a combined anaerobic process apparatus for treating organic wastes, which does not need additional treatment apparatus for microorganisms by returning and sharing the microorganisms produced from wet and dry anaerobic treatment processes.

Furthermore, the present invention provides with an eco-friendly combined anaerobic process apparatus, which can use bio-gas generated through treatment process of organics.

In order to achieve the objects described above, the present invention provides a combined anaerobic process apparatus for treating organic wastes, comprising a first solid-liquid separator to separate organic wastes into liquid wastes and solid wastes; an acid-forming tank to decompose the liquid wastes separated through the first solid-liquid separator using acid-forming microorganisms; a UASB reactor to decompose the liquid wastes discharged from the acid-forming tank using anaerobic microorganisms; a crushing tank to crush fine particle solid wastes separated through the first solid-liquid separator; a mixing tank to mix crushed solid wastes with microorganisms; and a dry anaerobic tank for treating mixed solid wastes.

Also, the combined anaerobic apparatus comprises a bio-gas storage tank connected to at least one tank among the acid-forming reactor, the UASB reactor, and the dry anaerobic reactor to store bio-gas generated from these reactors.

Furthermore, the present invention further comprises a precipitation tank, which makes solids deposited from liquid wastes discharged from the UASB reactor and removes them.

Herein, the present invention further comprises a tank for culturing microorganisms, which enables cultivation of the microorganisms, provided with liquid wastes including microorganisms from the precipitation tank or with solid wastes including microorganisms from the dry anaerobic tank.

Also, the present invention further comprises a mixing tank, which is provided with the microorganisms cultivated in the tank for culturing microorganisms.

Moreover, the present invention further comprises a second solid-liquid separator for filtering solid wastes from liquid wastes while moving from the acid-forming tank to the UASB reactor.

At this time, the solid wastes filtered by the second solid-liquid separator are provided to the acid-forming tank or the crushing tank.

Besides, some part of liquid wastes filtered by the second solid-liquid separator is provided to the acid-production tank or the moisture controlling tank.

In the meantime, the present invention further comprises a third solid-liquid separator for removes moisture from solid wastes discharged from the dry anaerobic tank.

Herein, the moisture separated by the third solid-liquid separator is returned into the acid-forming tank.

And, the present invention further comprises a moisture controlling tank for removing moisture from solid wastes while moving from the crushing tank to the mixing tank.

In addition, some part of the solid wastes, which is mixed with microorganisms discharged from the dry anaerobic tank, is returned to the mixing tank.

According to the present invention as stated hereinbefore, there is an advantage in that the present invention can more improve the treatment efficiency with applying wet treatment process and dry treatment process in an anaerobic manner to the liquid wastes and solid wastes, which were separated from organic wastes both into liquid wastes and solid wastes, respectively.

In addition, the present invention can shorten treatment time and enhance treatment efficiency by proceeding wet treatment process and dry treatment process simultaneously as well as sharing microorganisms generated in the both treatment processes.

Additionally, it is possible to obtain renewable energy in a way of collecting bio-gas generated by the treatment process. Further, the present invention enables non-discharging treatment process by circulating waste liquor generated by the dry treatment process. Thus, the present invention are advantageous in a eco-friendly view.

BRIEF DESCRIPTION OF THE DRAWINGS

The application of the preferred embodiments of the present invention is best understood with reference to the accompanying drawings, wherein:

The FIG. 1 is a scheme illustrating a merging treatment system for food wastes and sewage sludge.

Figure 1:
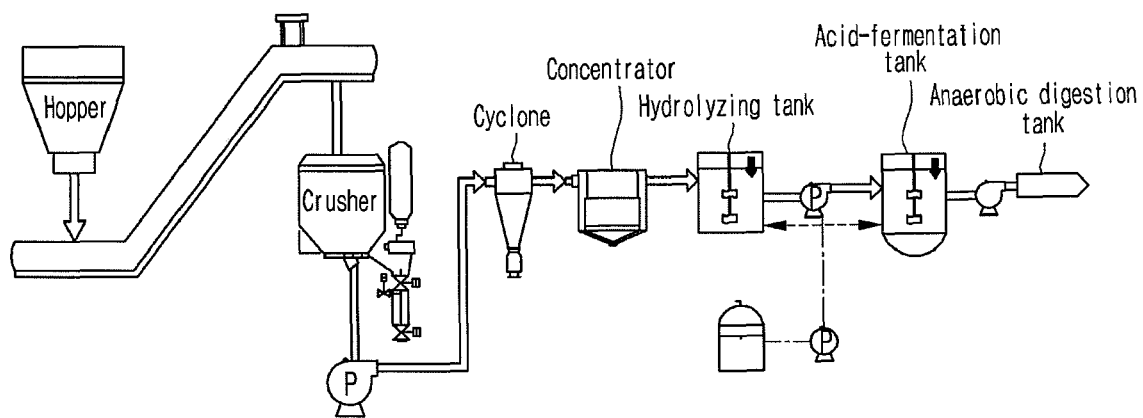
Figure 2:
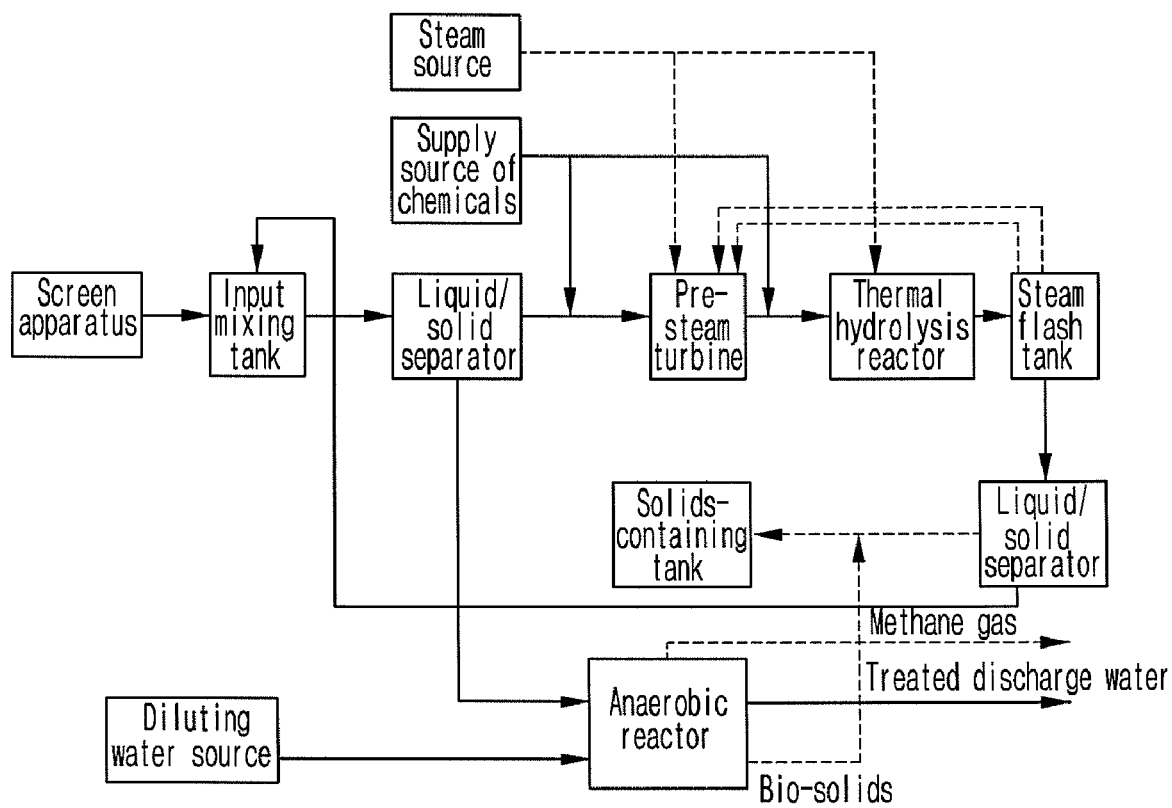

The FIG. 2 is a scheme illustrating a treatment method and apparatus for conventional particulate biodegradable organic wastes.

Figure 3:
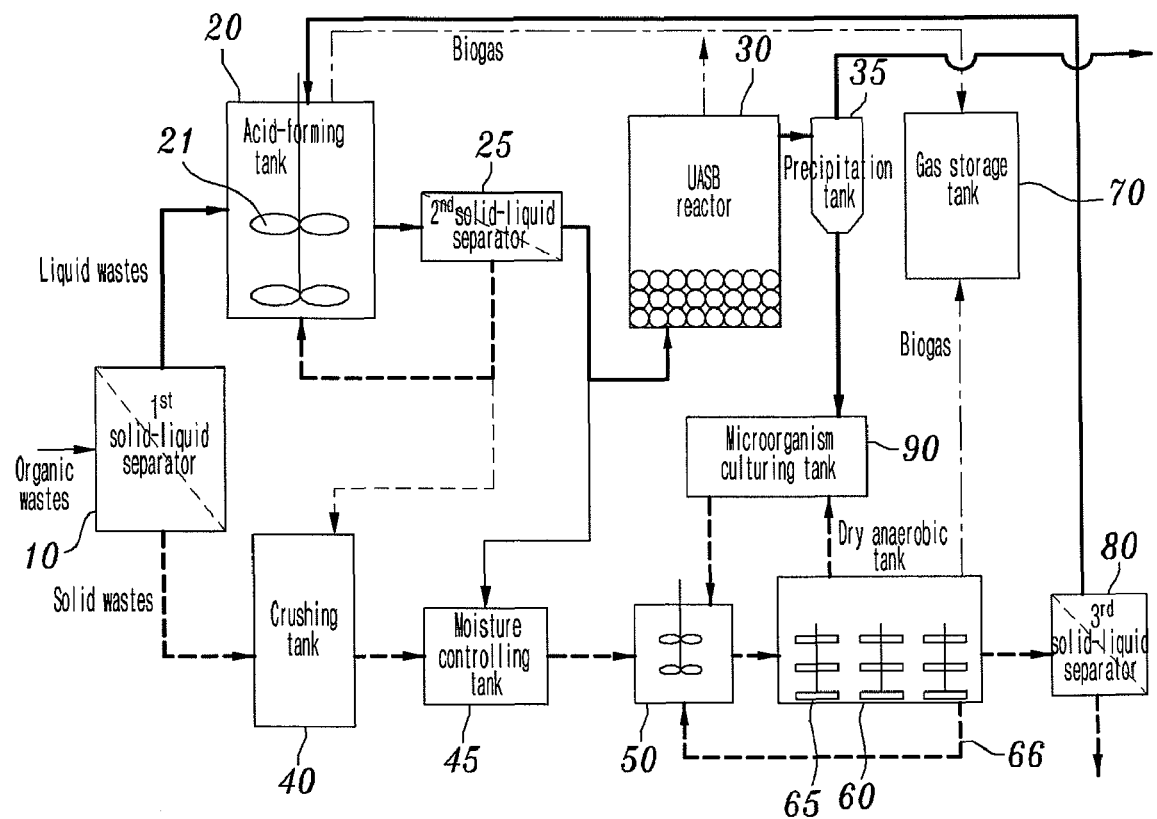

The FIG. 3 is a scheme illustrating the combined anaerobic process apparatus for treating organic wastes according to the present invention.

EXPLANATION OF THE MARKS ON THE MAIN PARTS OF THE DRAWINGS

10: A first solid-liquid separator 20: An acid-forming tank
21: A stirring apparatus 25: A second solid-liquid separator
30: A UASB reactor 35: A precipitation tank
40: A crushing tank 45: A moisture controlling tank
50: A mixing tank 60: A dry anaerobic tank
65: A stirring apparatus 66: return pipe
70: A bio-gas storage tank 80: A third solid-liquid separator
90: A microorganism reactor

DESCRIPTION OF THE PREFERRED EMBODIMENTS

Hereinafter, the present invention is described in detail.

The object and technical composition of the present invention and detailed description about its operation effect will be definitely understood by the explanation below, referring to the enclosed drawings showing desirable experimental examples of the present invention.

Unnecessary description, which does not include the different part compared to the conventional technology, is excluded, but technical idea of the present invention and range of protection thereof is not limited thereto.

Hereinafter, we explain about a combined anaerobic process apparatus for treating organic wastes of the present invention in detail, referring to the enclosed drawings.

The FIG. 3 is the scheme showing a combined anaerobic process apparatus for treating organic wastes of the present invention. As it can be referred to from the FIG. 3, the combined anaerobic process apparatus for treating organic wastes of the present invention separates common organic wastes into liquid wastes and solid wastes, respectively. And liquid wastes are treated anaerobically under wet conditions through an acid-production tank (20) and a USAB reactor (30), while solid wastes are crushed in a crushing tank (40) and then mixed with microorganisms, and treated anaerobically under dry conditions through a dry anaerobic tank (60).

Hereinafter, we explain about the combined anaerobic process apparatus for treating organic wastes in detail. The apparatus of the present invention comprises a first solid-liquid separator (10) to separate organic wastes into liquid wastes and solid wastes; an acid-forming tank (20) to decompose the liquid wastes separated by the first solid-liquid separator (10) using acid-forming microorganisms; a UASB reactor (30) to decompose the liquid wastes discharged from the acid-forming tank (20) using methane-forming microorganisms; a crushing tank (40) to crush solid wastes separated by the first solid-liquid separator (10) finely; a mixing tank (50) to mix solid wastes crushed by the crushing tank (40) with microorganisms; a dry anaerobic tank (60) to decompose solid wastes mixed with microorganisms in an anaerobic manner; and a bio-gas storage tank (70) to store the bio-gas generated in the treatment process of liquid wastes and solid wastes.

The first solid-liquid separator (10) is a device to separate organic wastes into liquid wastes and solid wastes. The device can be employ belt press, filter press and screw press, which separate using a mechanical press, or tilting screen, drum screen, vibration screen, which separate using gravity, or high-speed screw decanter, a centrifugal separator, which separate using gravity difference by centrifugal force, or low-speed screw decanter, which separates using centrifugal force and screen.

The liquid wastes, which are separated by the first solid-liquid separator (10), desirably have 10-20% of total solids compared to total amount in order to be decomposed efficiently by acid-forming microorganisms in the acid-forming tank (20). On the other hand, the solid wastes desirably have 80-90% of total solids compared to total amount in order to be decomposed efficiently by dry anaerobic microorganisms.

The acid-forming tank (20) is a reactor where the liquid wastes flowing in from the first solid-liquid separator (10) are partly filled up and the liquid wastes are decomposed by acid-forming microorganisms inside. In the acid-forming tank, the liquid wastes are anaerobically digested by acid-forming microorganisms inside.

During the process, the liquid wastes are mainly decomposed into sugars, alcohols and organic acids etc. by acid-forming microorganisms.

The acid-forming tank (20) is equipped with; a stirring apparatus (21) to make the liquid wastes actively react with microorganisms by stirring the liquid wastes inside, and a temperature controller (not drawn) to maintain the middle temperature condition (33-37° C.) or high temperature condition (53-57° C.), which are proper temperature for decomposing the liquid wastes.

The UASB reactor (30) is a reactor where the liquid organic wastes discharged from the acid-forming tank (20) are decomposed by microorganisms filled up inside. In the UASB reactor, some of microorganisms are filled up inside and, by the microorganisms the liquid wastes flowing in from the acid-forming tank (20) are anaerobically digested.

The UASB (Upflow Anaerobic Sludge Blanket) reactor (30) is an upward-flow-type blanket reactor, where the liquid wastes discharged from the acid-forming tank (20) flows into the low sides of the UASB reactor and the liquid wastes react with microorganisms while moving to upward of the UASB reactor (30), thereby being converted into bio-gas (methane gas+carbon dioxide).

The second solid-liquid separator (25) is present between the acid-forming tank (20) and the UASB reactor (30). The separator removes solids from the liquid wastes discharged from the acid-forming tank (20).

The second solid-liquid separator (25) is a device to remove solids from the liquid wastes discharged from the acid-production tank (20). And it can employ various kinds of solid-liquid separators such as the first solid-liquid separator (10) in order to filter solids in more than 200 μm diameter.

The liquid wastes, which are treated completely via the acid-forming tank (20) and the USAB reactor, is purified by removing solids in a precipitation tank (35) which is installed in the latter part of the UASB reactor (30). The clean liquid wastes are then directly discharged into a river or discharged under the process of sewage disposal after moving to a sewage disposal plant, or stored in a separate storage tank for liquid manure.

The crushing tank (40) finely crushes solid wastes or organic Municipal Solid Waste (MSW) which are filtered by the first solid-liquid separator (10). In the crushing tank (40), the solid wastes may have increased surface area or may actively react with dry microorganisms by destruction of cell structure in microorganisms present in sludge.

The crushing tank (40) may employ a mechanical apparatus such as a ball mill which crushes using an impact incurred by the movement of several balls within a cylinder, rod mill which is a rotating crushing apparatus using a steel bar as a crushing means, jaw crusher, impact crusher, and wheeler mill or physical/chemical apparatuses such as ultrasonic Apparatus and heat treatment.

At this time, the solid wastes desirably have less than 50 mm diameter by crushing when considered contact efficiency with microorganisms and treatment efficiency.

The solid wastes, finely crushed in the crushing tank (40), are passed through the moisture controlling tank (45) for adjusting to suitable moisture content and the mixing tank (50) where the solid wastes are mixed with microorganisms. The solid wastes are then anaerobically digested under the dry condition in the dry anaerobic tank (60).

As stated hereinbefore, the moisture controlling tank (45) enable solid wastes to contain proper moisture. And the moisture controlling tank can employ various kinds of solid-liquid separators such as the first/second solid-liquid separators (10, 25) as well as common drying machine.

The mixing tank (50) is a device where the solid wastes discharged from the moisture controlling tank (45) are mixed with microorganisms cultured in the microorganisms culturing tank (90) and semi-solid wastes containing large amount of microorganisms in the dry anaerobic tank (60). The mixing tank consists of common stirring and mixing device.

At this moment, the solid wastes discharged from the moisture controlling tank (45) should have more than 15% of total solids or less than 85% or water content.

The dry anaerobic tank (60) is a device where solid wastes mixed with microorganisms in the mixing tank (50) are anaerobically digested by being stayed under the dry condition for a certain period of time. The dry anaerobic tank employs a stirring apparatus in order for the solid wastes to be slowly moved and stirred.

The dry anaerobic tank (60) is connected with the mixing tank (50) via return pipe (66), thereby some of solid wastes under being treated in the dry anaerobic tank are returned to the mixing tank (50).

The microorganisms culturing tank (90) is connected with the mixing tank (50) and provides microorganisms to the mixing tank (50). In addition, the microorganism culturing tank is connected with the precipitation tank (35) and dry anaerobic tank (60), thereby surplus microorganisms is provided from the precipitation tank (35) and dry anaerobic tank (60), and is cultured under conditions of the middle temperature (33-37° C.) or high temperature (53-57° C.). And the microorganisms are provided to the dry anaerobic tank (60) via the mixing tank (50).

Treating the solid wastes using the microorganisms cultured in the microorganisms culturing tank (90), provides an advantage of decreased treatment time.

The crushing tank (40) and the moisture controlling tank (45) are connected with the second solid-liquid separator (25), and the solid wastes filtered from the second solid-liquid separator (25) are returned to the acid-forming tank (20), thus playing a role in maintaining acid-forming bacteria in the acid-forming tank (20) constantly.

Also, some of the solid wastes filtered are provided to the crushing tank (40), and liquid wastes are optionally provided to the moisture controlling tank (45).

At this time, the liquid wastes which are provided to the moisture controlling tank (45) contain various nutrients (nitrogen, phosphorus and other minor elements). Thus the liquid wastes are mixed with the solid wastes flowed into the moisture controlling tank (45), thus can decrease supply of additional nutrients by providing necessary nutrients for enhancing activity of the microorganisms in the dry anaerobic tank (60).

After being treated and discharged from the dry anaerobic tank (60), the solid wastes are moved into the third solid-liquid separator (80). Through the third solid-liquid separator, perfect sludge with no moisture is discharged and waste water is returned to the acid-forming tank (20).

Bio-gas is generated in the acid-forming tank (20), the UASB reactor (30) and the dry anaerobic tank (60) during the treatment process of liquid wastes and solid wastes, and the generated bio-gas is moved to the bio-gas storage tank which is connected with the acid-forming tank (20), the UASB reactor (30) and the dry anaerobic tank (60), and stored.

We hereinafter explain about the process of a combined anaerobic process apparatus for treating organic wastes of the present invention in detail, referring to the drawings.

Organic wastes containing lots of moisture and solids are separated into liquid wastes and solid wastes by the first solid-liquid separation apparatus (10).

The liquid wastes separated through the first solid-liquid separator (10) are moved into the acid-forming tank (20) which are previously filled up with acid-forming microorganisms inside and anaerobically digested under wet condition.

At this time, the liquid wastes are stirred by a stirrer (21) equipped in the acid-forming tank (20) and are maintained in the middle temperature condition (33-37° C.) or high temperature condition (53-57° C.) which are excellent temperatures for digestion efficiency, by a heating system. As a result, treatment time decreases and treatment efficiency enhances.

After filtering the solids having more than 200 μm diameter from the liquid wastes decomposed by the acid-production tank (20) through the second solid-liquid separator (25), the liquid having less than 200 μm diameter is moved to the UASB reactor (30) and anaerobically digested.

At this moment, the solids filtered through the second solid-liquid separator (25) contain microorganisms cultured in the acid-forming tank (20). And some of the solids are returned to the acid-forming tank (20) and facilitate anaerobic digestion of liquefied solids, and the other filtered through the second solid-liquid separator (25) are provided to the crushing tank (40).

Solid wastes flowing in the crushing tank (40) are used as a lubrication means and temperature controller means, thus can decrease friction incurred during the crushing process and can maintain temperature constantly.

The UASB reactor (30) is a kind of upward-flow-typed blanket reactor, where the liquid wastes which solids are removed through the second solid-liquid separator (25) and flow into the lower side of the UASB reactor (30) and the liquid wastes flowing into are decomposed by the particulate anaerobic microorganisms filled up inside the USAB reactor (30) on the way of moving to the upper side of the UASB reactor (30).

After being digested anaerobically through the UASB reactor (30), the liquid wastes are passed through the precipitation tank (35) which is set up in the back part of the USAB reactor (30). As a result, clear liquid wastes are discharged directly or moved to a sewage disposal [treatment] plant and discharged after post-treatment.

The acid-forming tank (20) and the UASB reactor (30) are anaerobic reactors, and bio-gas is generated during the treatment process. The generated bio-gas is moved and stored to the bio-gas storage tank (70) connected with the acid-forming tank (20) and the UASB reactor (30).

After the solid wastes separated through the first solid-liquid separator (10) are moved to the crushing tank (40), they are finely crushed, resulting in having less than 500 mm diameter (10).

The solid wastes crushed through the crushing tank (40) are properly controlled in moisture content via the moisture controlling tank (45), and the solid wastes moved to the mixing tank (50) are evenly mixed with the microorganism provided from the tank for culturing microorganism.

As stated hereinbefore under the process, the solid wastes filtered through the second solid-liquid separator flow into the crushing tank (40). And the liquid wastes generated in the second solid-liquid separator flow into the moisture controlling tank (45), thereby play a role in controlling moisture of the solid wastes or providing nutritious elements.

The tank for culturing microorganism (90) for providing microorganisms to the mixing tank (50) is connected with the precipitation tank (35) and the dry anaerobic tank (60), thereby enables microorganisms to have an excellent activity by being provided with sludge containing microorganisms from the precipitation tank (35) and the dry anaerobic tank (60).

Through the tank for culturing microorganism, microorganisms with an excellent activity are cultivated, and these microorganisms are provided to the mixing tank (50) and mixed with solid wastes and treated in the dry anaerobic tank (60). Thus, there is an advantage that treatment time is decreased.

The solid wastes evenly mixed with microorganisms through the mixing tank (50) flow into the dry anaerobic tank (60), and are anaerobically digested under dry condition for a certain period of time.

During the process, the solid wastes are slowly stirred using the stirring apparatus (65) installed inside the dry anaerobic tank (60). Hereby, there is an advantage that reaction between the solid wastes and microorganisms in the dry anaerobic tank (60) are evenly made.

The dry anaerobic tank (60) is also an anaerobic reactor, and during the process bio-gas is generated. The generated bio-gas is moved and stored to the bio-gas storage tank (70) which is connected with the acid forming tank (20) and the UASB reactor (30).

The solid wastes treated completely through the dry anaerobic tank (60) is passed through the third solid-liquid separator (80) and at the time moisture is removed therefrom, discharged.

At this time, the waste water filtered through the third solid-liquid separator (80) are returned to the acid-forming tank (20) and retreated.

The present invention has advantages that treatment efficiency is remarkably enhanced and amounts of discharged sludge and waste water are decreased by dividing the organic wastes into the liquid wastes and solid wastes and treating each waste under wet or dry condition according to its feature.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A combined anaerobic process for treating organic wastes comprising:
   a first solid-liquid separator to separate organic wastes into liquid wastes and solid wastes;
   an acid-forming tank to decompose the liquid wastes separated by the first solid-liquid separator with acid-forming microorganisms;
   a USAB reactor to decompose the liquid wastes discharged from the acid-forming tank using anaerobic microorganisms;
   a crushing tank to finely crush solid wastes separated by the first solid-liquid separator;
   a mixing tank to mix solid wastes crushed by the crushing tank with microorganisms; and
   a dry anaerobic tank to dry solid wastes mixed with microorganisms in an anaerobic manner.

2. The combined anaerobic process for treating organic wastes according to claim 1, further comprising a bio-gas storage tank which is connected with at least one tank selected from the acid-production tank, the UASB reactor and the dry anaerobic tank, in order to store bio-gas generated from at least one tank selected from the acid-forming tank, the UASB reactor and the dry anaerobic tank.

3. The combined anaerobic process for treating organic wastes according to claim 1, further comprising a precipitation tank which removes solid from the liquid wastes discharged from the UASB reactor, by precipitation.

4. The combined anaerobic process for treating organic wastes according to claim 1 or 3, further comprising a tank for culturing microorganism, which cultivates microorganisms by being provided with liquid wastes containing microorganisms from the precipitation tank and is provided with solid wastes containing microorganisms from the tank for culturing microorganism.

5. The combined anaerobic process for treating organic wastes according to claim 4, wherein the microorganisms cultivated in the tank for culturing microorganism are provided to the mixing tank.

6. The combined anaerobic process for treating organic wastes according to claim 1, further comprising a third solid-liquid separator removing moisture from solid wastes discharged from the dry anaerobic tank.

7. The combined anaerobic process for treating organic wastes according to claim 6, wherein the moisture removed through the third solid-liquid separator is returned to the acid-forming tank.

8. The combined anaerobic process for treating organic wastes according to claim 1, further comprising a moisture controlling tank removing moisture from solid wastes moving from the crushing tank to the mixing tank.

9. The combined anaerobic process for treating organic wastes according to claim 1, wherein further include the second solid-liquid separator filtering solid wastes from liquid wastes moving from the acid-forming tank to the UASB reactor.

10. The combined anaerobic process for treating organic wastes according to claim 9, wherein the solid wastes filtered through the second solid-liquid separator is provided to the acid-forming tank or the crushing tank.

11. The combined anaerobic process for treating organic wastes according to claim 8 or 9, wherein the liquid wastes filtered through the second solid-liquid separator is provided to the acid-forming tank or the moisture controlling tank.

12. The combined anaerobic process for treating organic wastes according to claim 1, wherein some of solid wastes, mixed with microorganisms which is discharged from the dry anaerobic tank, are returned to the mixing tank.

13. A combined anaerobic process for treating organic wastes including:
  a first solid-liquid separator to separate organic wastes into liquid wastes and solid wastes;
  an acid-forming tank to decompose the liquid wastes separated by the first solid-liquid separator using acid-production microorganisms;
  a second solid-liquid separator to filter solid wastes from the liquid wastes, the liquid wastes is provided to the acid-forming tank, a crushing tank or a moisture controlling tank;
  a USAB reactor to decompose the liquid wastes discharged from the acid-forming tank using anaerobic microorganisms;
  a precipitation tank to remove solids from the liquid wastes discharged from the USAB reactor by precipitation;
  the crushing tank to crush solid wastes separated by the first solid-liquid separator finely;
  the moisture controlling tank to remove moisture from solid wastes crushed through from crushing tank;
  a mixing tank to mix solid wastes crushed by the crushing tank with microorganisms;
  a dry anaerobic tank to dry solid wastes mixed with microorganisms in an anaerobic manner, wherein some of solid wastes are returned to the mixing tank;
  a bio-gas storage tank which is connected with at least one tank selected from the acid-forming tank, the UASB reactor and the dry anaerobic tank in order to store bio-gas generated from at least one tank selected from the acid-forming tank, the UASB reactor and the dry anaerobic tank;
  a third solid-liquid separator to remove moisture from solid wastes discharged from the dry anaerobic tank, wherein the moisture removed is returned to the acid-forming tank; and
  a microorganism culturing tank to be provided with liquid wastes containing microorganisms from the precipitation tank and be provided with solid wastes containing microorganisms from the dry anaerobic tank, wherein the cultured microorganisms is provided to the mixing tank.

* * * * *